(12) United States Patent
Pawlowski et al.

(10) Patent No.: US 6,219,741 B1
(45) Date of Patent: *Apr. 17, 2001

(54) TRANSACTIONS SUPPORTING INTERRUPT DESTINATION REDIRECTION AND LEVEL TRIGGERED INTERRUPT SEMANTICS

(75) Inventors: Stephen S. Pawlowski, Beaverton, OR (US); Daniel G. Lau, Los Altos, CA (US); Kimberly C. Weier, Tigard, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,232

(22) Filed: Dec. 10, 1997

(51) Int. Cl.[7] .............................. G06F 13/24; G06F 13/26
(52) U.S. Cl. ..................... 710/260; 710/261; 710/262; 710/264; 710/265
(58) Field of Search ..................................... 710/260–269

(56) References Cited

U.S. PATENT DOCUMENTS

| | | | |
|---|---|---|---|
| 5,283,904 | * 2/1994 | Carson et al. | 710/266 |
| 5,511,200 | * 4/1996 | Jayakumar | 710/266 |
| 5,696,976 | 12/1997 | Nizar et al. . | |
| 5,721,931 | 2/1998 | Gephardt et al. . | |
| 5,758,169 | * 5/1998 | Nixar et al. | 710/266 |
| 5,848,279 | * 12/1998 | Wu et al. | 710/266 |
| 5,857,090 | * 1/1999 | Davis et al. | 710/266 |
| 5,881,293 | 3/1999 | Olarig et al. . | |
| 6,041,377 | 3/2000 | Mayer et al. . | |

* cited by examiner

Primary Examiner—Ayaz R. Sheikh
Assistant Examiner—Rupal D. Dharia
(74) Attorney, Agent, or Firm—Alan K. Aldous (57) ABSTRACT

In one embodiment, the invention includes an apparatus, such as a bridge, for use with a computer system having a processor bus. The apparatus includes decode logic to receive through the processor bus a task priority update transaction including data representative of a task priority designation of a processor of the computer system, and to provide a signal responsive thereto. The apparatus also includes remote priority capture logic to receive the signal responsive to the task priority update transaction and update contents of the remote priority capture logic in response thereto. In another embodiment, the invention includes an apparatus for use with a computer system having a processor bus. The apparatus includes decode logic to receive through the processor bus an end-of-interrupt (EOI) transactions and to provide an EOI signal responsive thereto. The apparatus also includes an interrupt controller including a table having a state bit that is set in response to the interrupt controller receiving an interrupt signal and reset in response to the interrupt controller receiving the EOI signal.

10 Claims, 8 Drawing Sheets

FIRST PHASE 182 | ADDRESS (DON'T CARE) | COMMAND 01000 |

SECOND PHASE 184 | | ID | BE (08) | E/D | TPR |

I/O REDIRECTION TABLE 240

| | | |
|---|---|---|
| INTERRUPT INPUT 0 | VECTOR 0 | STATE BIT |
| INTERRUPT INPUT 1 | VECTOR 1 | STATE BIT |
| INTERRUPT INPUT 2 | VECTOR 2 | STATE BIT |
| | | |
| INTERRUPT INPUT N | VECTOR N | STATE BIT |

FIG. 9

| | ADDRESS | REQUEST |
|---|---|---|
| FIRST PHASE 244 | ADDRESS FEE with Aa3# = 1 | COMMAND 01001 |
| SECOND PHASE 246 | BE (08)   Ab6# = 1   Ab5# = 1 | |
| DATA PHASE 248 | | VECTOR |

FIG. 10

TRANSACTIONS SUPPORTING INTERRUPT DESTINATION REDIRECTION AND LEVEL TRIGGERED INTERRUPT SEMANTICS

RELATED APPLICATION

The present application and application Ser. No. 08/988,233, entitled "Mechanism for Performing Interrupt Destination Redirection", which is filed concurrently with the present application, include overlapping disclosures but claim different subject matter.

BACKGROUND OF THE INVENTION

1. Technical Field of the Invention

The present invention relates to a processor system and, more particularly, to a processor system including processors that provide task priority update transactions and end-of-interrupt transactions on a processor bus.

2. Background Art

Processors such as the Pentium® processor and the Pentium® Pro processor manufactured by Intel Corporation are often used in multi-processor systems. Various devices including input and/or output (I/O) devices and other processors may seek to interrupt a processor. To interrupt a processor, an I/O device provides a signal to an interrupt controller, which in turn presents an interrupt request to the processor.

In the case of the Pentium® processor and Pentium® Pro processor, the interrupt controller communicates interrupt information to the processors through a three-wire serial bus, called an APIC (Advanced Programmable Interrupt Controller) bus. The APIC serial bus includes two data conductors and a clock signal conductor.

The Pentium® processor and Pentium® Pro processor include an internal APIC. The APIC includes a local mask register called a Task Priority Register (TPR) that has 8 bits to designate up to 256 priority states, although some of them are reserved. The contents of the TPR is changed to reflect the level of priority of the tasks being performed by the processor.

A lowest priority interrupt is one that although directed to a particular processor, may be redirected to a processor in a group of processors having the lowest priority in its TPR. The arbitration process involves comparing the 8 bits of the TPR of each processor participating in the arbitration. The bits of each processor are asserted one bit at a time, beginning with the most significant bit (MSB), onto the APIC bus line, which is connected in an open drain arrangement to each of the processors. The bits are inverted onto the APIC bus line so that a low voltage (0) has a higher priority that a high voltage (1). First, the MSB from the TPR of each processor participating in the arbitration is asserted on the APIC bus line. If any of the processors asserts a low voltage on the APIC bus line, the line is pulled low. A processor asserting a high voltage discovers there is another processor with a lower priority if the APIC bus line is pulled low. The processor drops out of consideration if another processor has a lower priority. Then, the second MSB from the TPR of each remaining processor is asserted on the APIC bus line. If a processor asserts a high voltage as the second MSB, but the line is pulled low, the processor drops out of consideration. The third MSB and later the fourth MSB of each remaining processor are asserted on the APIC bus line in similar fashion and so forth to the least significant bit (LSB). If two or more processors have equal priorities after all eight bits have been asserted, the processor with the lowest local APIC identification (ID) number is chosen to receive the interrupt vector. The local APIC ID number is assigned at power up.

The APIC serial bus is also used to provide end-of-interrupt (EOI) signals to interrupt controllers. In the case of level triggered interrupts, a state bit in an I/O redirection table in the interrupt controller is set when an interrupt request is sent to a processor. The state bit is reset when the EOI signal is received by the interrupt controller. If a level triggered interrupt signal is detected at the interrupt controller input port after the EOI is received, the interrupt controller sends an interrupt signal to the processors in response to that interrupt signal.

There are certain disadvantages with the APIC serial bus. First, the serial bus is poor at voltage scaling between the interrupt controller (e.g., 3.3 volts) and the processor (e.g., 2.5 or 1.8 volts). It is difficult for provide transistors in a processor that interface between such disparate voltages. As the voltage of the processor core decreases with new generations of processors, the problem will be even greater.

Second, the frequency of the processor core (e.g., often much greater than 200 MHz) is much greater than the frequency of the APIC serial bus (e.g., 16 MHz). As processor frequencies increase, the problem will be even greater. It is difficult to interface between such disparate frequencies. The problem is greater because the signals are independent of each other.

Third, the APIC serial bus is relatively slow. In some implementations, it takes roughly 2 to 3 microseconds to deliver an interrupt. As more I/O intensive functions are used, the speed at which the serial bus can deliver interrupts becomes limiting.

The present invention is directed to over coming or reducing the effect of one or more the above-recited problems with the APIC serial bus.

SUMMARY OF THE INVENTION

In one embodiment, the invention includes an apparatus for use with a computer system having a processor bus. The apparatus includes decode logic to receive through the processor bus a task priority update transaction including data representative of a task priority designation of a processor of the computer system, and to provide a signal responsive thereto. The apparatus also includes remote priority capture logic to receive the signal responsive to the task priority update transaction and update contents of the remote priority capture logic in response thereto.

In another embodiment, the invention includes an apparatus for use with a computer system having a processor bus. The apparatus includes decode logic to receive through the processor bus an end-of-interrupt (EOI) transactions and to provide an EOI signal responsive thereto. The apparatus also includes an interrupt controller including a table having a state bit that is set in response to the interrupt controller receiving an interrupt signal and reset in response to the interrupt controller receiving the EOI signal.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION OF PREFERRED EMBODIMENTS

A. Systems Including Remote Priority Capture Logic and Lowest Priority Logic

Figure 1:
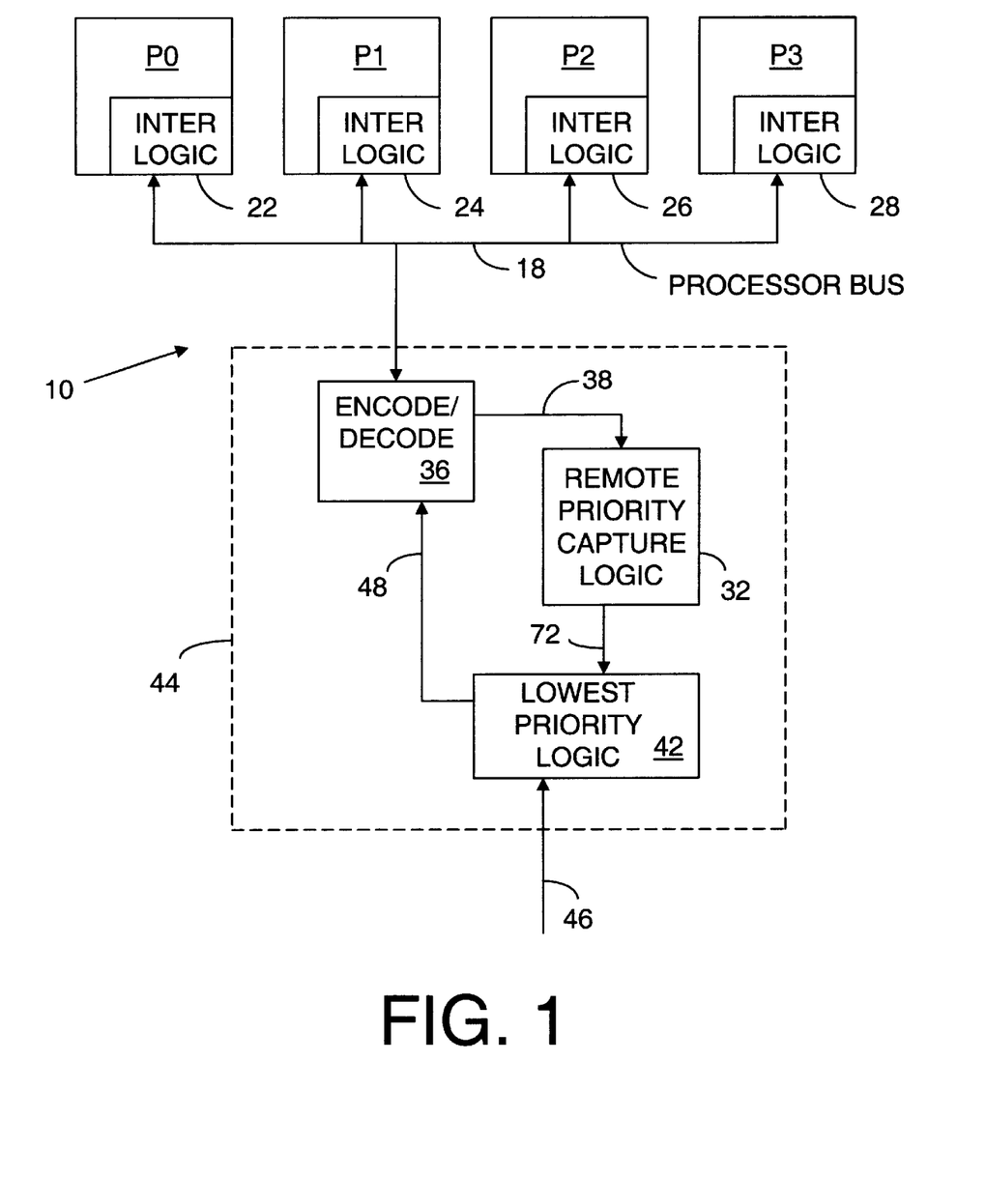
FIG. 1 is a block diagram representation of a multi-processor system including lowest priority logic for directing interrupts to a lowest priority processor.

Referring to FIG. 1, a multi-processor computer system 10 includes processors P0, P1, P2, and P3 connected through a processor bus 18. In some embodiments, processor bus 18 is referred to as a front side bus. The invention may be used in connection with a system having more or less than four processors. Processors P0, P1, P2, and P3 include interrupt control logic 22, 24, 26, and 28, respectively, which include a task priority designation that indicates a task priority, which is the priority level at which interrupts are serviced. As an example, the task priority designation may be an 8-bit number. Typically, if the priority of the interrupt is lower than the value in the task priority register of the processor, then the processor will not act on the interrupt.

Remote priority capture logic 32 holds task priority data that are indicative of task priorities of those of processors P0, P1, P2, and P3 that are available for lowest priority interrupt destination arbitration (LPIDA). For example, the task priority data may be the 4 MSBs of the task priority designation of one or more of processors P0, P1, P2, and P3. As used herein, the term "remote" means off a processor die. Under one embodiment, remote priority capture logic 32 also holds task priority data that is indicative of task priorities of those of processors P0, P1, P2, and P3 that are not available for LPIDA, but are operating in system 10. The task priority data may be assembled in remote priority capture logic 32 as follows. Signals representative of the task priority of one or more of processors P0, P1, P2, and P3 are provided by the processor(s) to processor bus 18. Encode/decode logic 36 decodes these signals from processor bus 18 and provides signals responsive to them to remote priority capture logic 32 through conductors 38. There is not necessarily a one-to-one correspondence between bits of the signals on processor bus 18, conductors 38, and remote priority capture logic 32. For example, the bits could be inverted.

A write cycle signal including a lowest priority interrupt message is received by lowest priority logic 42 through conductors 46. Lowest priority logic 42 performs LPIDA using the task priority data in remote priority capture logic 32 to select one of processors P0, P1, P2, and P3 to receive the interrupt. A central agent 44 includes encode/decode logic 36, remote priority capture logic 32, and lowest priority logic 42. The redirected interrupt message is provided through conductors 48 to encode/decode logic 36.

Processors P0, P1, P2, and P3 have identification numbers, e.g., APIC IDs. The APIC ID may be, for example, supplied at power on or reset. Lowest priority logic 42 provides the selected APIC ID number with the interrupt message. The interrupt message is provided through encode/decode logic 36 to processor bus 18 and the selected processor. Encode/decode logic of the selected processor recognizes the APIC ID number and passes the interrupt message. The interrupt message with associated bits (e.g., APIC ID number) may be passed in only one or in more than one phase or packet.

Where two or more processors have an equal lowest priority, lowest priority logic 42 may select the processor based on, for example, highest or lowest processor APIC ID, or in a round robin basis. The term "lowest priority" does not require that there be more than two different priority values. For example, if there is only one value of task priority data, it is the lowest.

Examples of the interrupt messages or other interrupt signals that may be provided over processor bus 18 include interrupt destination and vector signals, interrupt acknowledge signals, end-of-interrupt (EOI) signals, interprocessor interrupt (IPI) messages, other control signals or a combination of these signals. Some interrupt messages are not lowest priority signals and should not be redirected.

A lowest priority interrupt message may be provided to a processor destination by an interrupt controller, other circuitry, or the operating system (OS). In such a case, lowest priority logic 42 provides a destination redirection. However, the destination selected by lowest priority logic 42 may be the same as the original destination, because the original destination happened to be the lowest priority processor. Accordingly, redirection does not mean a different direction, but a direction provided at a later stage. Alternatively, in the case of lowest priority interrupt messages, the processor destination may be provided for the first time by lowest priority logic 42.

The processor may provide the signals that are representative of task priority to processor bus 18 under the initiative of the processor providing the signal or under the request of external logic. For example, in a first embodiment, processors P0, P1, P2, and P3 provide signals representative of their task priority designations to processor bus 18 each time the task priority designation is changed. In a second embodiment, processors P0, P1, P2, and P3 provide signals representative of their task priority designations in response to a request from lowest priority logic 42 or an interrupt controller in response to their receiving a lowest priority interrupt message. In a third embodiment, remote priority capture logic 32 periodically requests an update of the processors. Other mechanisms may be used for updating the task priority data in remote priority capture logic 32. The operating system or other software may direct the updates.

Figure 2:
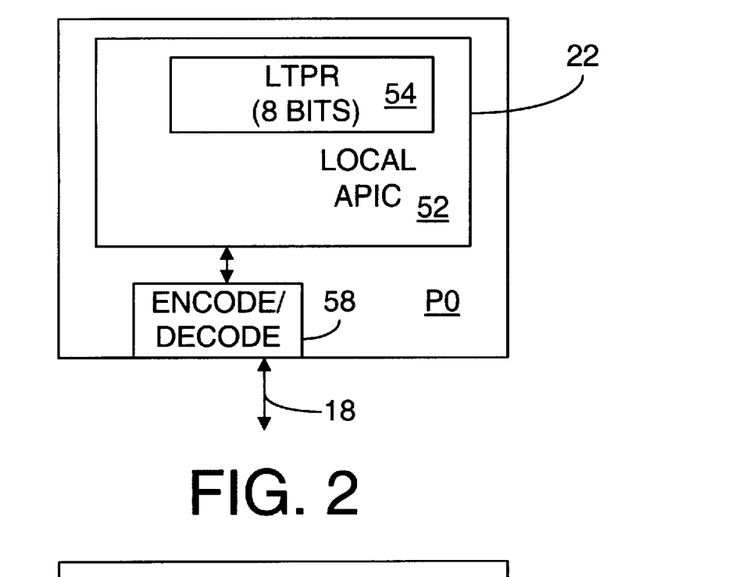
FIG. 2 is a block diagram representation of an example of certain details of one embodiment of the processors of the system of FIG. 1.
Figure 3:
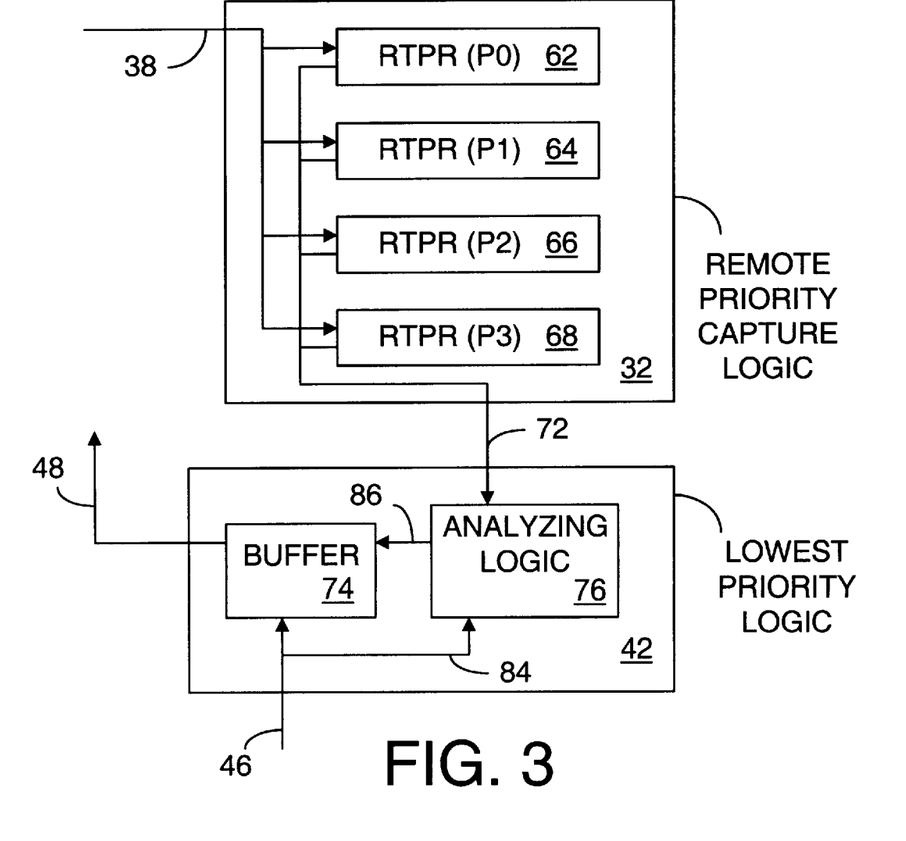
FIG. 3 is a block diagram representation of an example of certain details of one embodiment of the remote priority capture logic and lowest priority logic of FIG. 1.

Referring to FIG. 2, as an example, processor P0 includes a local APIC 52 which includes a local TPR (LTPR) 54. APIC 52 is an example of structure within interrupt control logic 22. In one embodiment, LTPR 54 holds an 8 bit task priority designation, the first 4 MSBs of which specify 16 priority classes. In other embodiments, LTPR 54 could have a greater or lesser number of bits, or bits with different or additional significance. Referring to FIGS. 1, 2, and 3, encode/decode logic 58 includes encode logic that encodes, for example, the 4 MSBs of LTPR 54 onto a signal for processor bus 18 to be decoded by encode/decode logic 36, which provides signals on conductors 38 to remote priority capture logic 32.

Referring to FIGS. 2 and 3, one embodiment of remote priority capture logic 32 includes remote task priority registers (RTPRs) 62, 64, 66, and 68. RTPR 62 holds task priority data indicative of a task priority specified in LTPR 54 of processor P0. RTPRs 64, 66, and 68 hold task priority data indicative of task priorities specified in LTPRs (not shown) of processor P1, P2, and P3 respectively.

Figure 4:
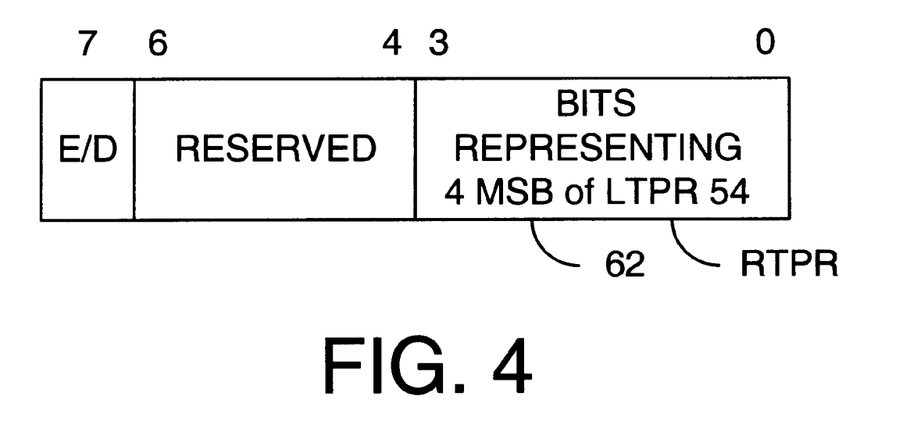
FIG. 4 is an illustration of one embodiment of a remote task priority register (RTPR) in the remote priority capture logic of FIG. 3.

Referring to FIG. 4, as an example, RTPR 62 includes four bits (e.g., bits 0–3) that holds task priority data that is indicative of a task priority specified in LTPR 54 of processor P0, if processor P0 is available for LPIDA. These four bits in RTPR 62 do not have to be identical to the four MSBs of the LTPR. For example, they could be inverted. RTPR 62 also includes a bit (e.g., bit 7), which indicates whether processor P0 is available for LPIDA. In the particular embodiment, RTPRs 64, 66, and 68 each also include four bits that hold task priority data that is indicative of task priorities specified in LTPRs (not shown) in processors P1, P2, and P3, respectively, if processors P1, P2, and P3 are available for LPIDA. RTPRs 64, 66, and 68 also include an enable/disable bit that indicates whether processors P1, P2, and P3 are available for LPIDA. The enable/disable bit is enabled with a first voltage level (e.g., a logical high voltage), indicating a processor is available for LPIDA. The enable/disable bit is disabled with a second voltage level (e.g., a logical low voltage), indicating a processor is not available for LPIDA.

The task priority data in the RTPR is indicative of the task priority designation of the LTPR even though the RTPR task priority data is not identical to the task priority designation in the LTPR. For example, in an embodiment described above, the RTPR holds the 4 MSBs of the 8 bit task priority designation of a corresponding LTPR. However, for purposes of this invention, the 4 MSBs of an 8-bit number are considered to be indicative of the entire 8 bit number. The 4 MSBs are comprehensive enough to achieve lowest priority semantics. In other words, the 4 LSBs of an 8-bit task priority designation are not significant enough to matter for purposes of this invention. Of course, the task priority data in the RTPR could include all the bits of the LTPR.

Further, depending on the implementation, there is some chance that the task priority data in task remote priority capture logic 32 will sometimes not exactly reflect the actual task priority designations of the processors available for LPIDA, because the task priority designations change with time. However, the task priority data is still indicative of the task priorities of the processors available for LPIDA, even if the indication is not always perfect or LPIDA does not always select the processor with the lowest priority. In the case in which a processor is not available for LPIDA because the enable/disable bit is set to disable, in one embodiment, the task priority data in that RTPR is updated just as if the enable/disable bit were set to enable. In another embodiment, the task priority data is not updated until the enable/disable bit will be set to enable. In that last mentioned embodiment, the task priority data might not be indicative of a task priority of the corresponding processor, although it does not matter because it is not used in LPIDA. In that embodiment, the contents of the four bits is not updated. Of course, in the case in which a processor is not available for LPIDA because the processor is not active or missing from the system, the contents of the four task priority data bits of the corresponding RTPR will be meaningless.

If one of the processors of a multi-processor system is not present in the system, at a given APIC ID, the enable/disable bit is disabled in the corresponding RTPR. Under one embodiment, enable/disable bit of the RTPR needs to be set the first time the RTPR is accessed (updated by the appropriate processor) and, once set, must remain set until a 'cold' reset event occurs. The RTPR can be updated based on a number of event types. Two of the possible options are: (1) direct BIOS access to the RTPR or (2) a RTPR update special cycle transaction (an example of which described in connection with FIG. 7) by the corresponding agent, controls the state of the enable/disable bit. An upgrade/downgrade of the RTPR may occur as a result of Power-On Self Test (POST) before an I/O interrupt enters the system. The processor may also raise its priority to the highest level to avoid an interrupt.

In the illustrated example of FIG. 4, RTPR 62 includes additional bits (e.g., bits 4–6). In one embodiment of the invention, the additional bits are not used and are reserved. In another embodiment of the invention, one or more of the bits may be used for various purposes. In still another embodiment, there are no additional bits in the RTPRs. The enable/disable function may be accomplished with two bits rather than one.

Referring to FIG. 3, as an example, lowest priority logic 42 may include a buffer 74 and analyzing logic 76. Analyzing logic 76 has access to the contents of the RTPRs through conductors 72. Analyzing logic 76 performs LPIDA to determine which of the participating RTPRs has the lowest priority (which may include resolving any ties in lowest priority). An optional buffer 74 may hold the lowest priority interrupt message until LPIDA is completed. A signal on conductor 86 indicates the APIC ID number or other indication of the selected processor, which is provided through encode/decode logic 36 to bus 18. The APIC ID number or other indication may be provided in a variety of forms to bus 18, and may be in the same or a different phase or packet than other information of the interrupt message.

Lowest priority logic 42 may use any of various known techniques to determine which of the participating RTPRs has the lowest value (or highest value if a logical 1 value is a lower priority that a logical 0). For example, lowest priority logic 42 could eliminate RTPRs having a logic 1 value in the MSB, and then eliminate RTPRs having bits having a logic 1 value in the second MSB and so forth. Lowest priority logic 42 could subtract values to see which is greater based on whether the result is positive or negative, or use various other methods. In most, if not all of the techniques, lowest priority logic 42 will select the processor much faster than in the case of APIC serial bus arbitration.

Figure 5:
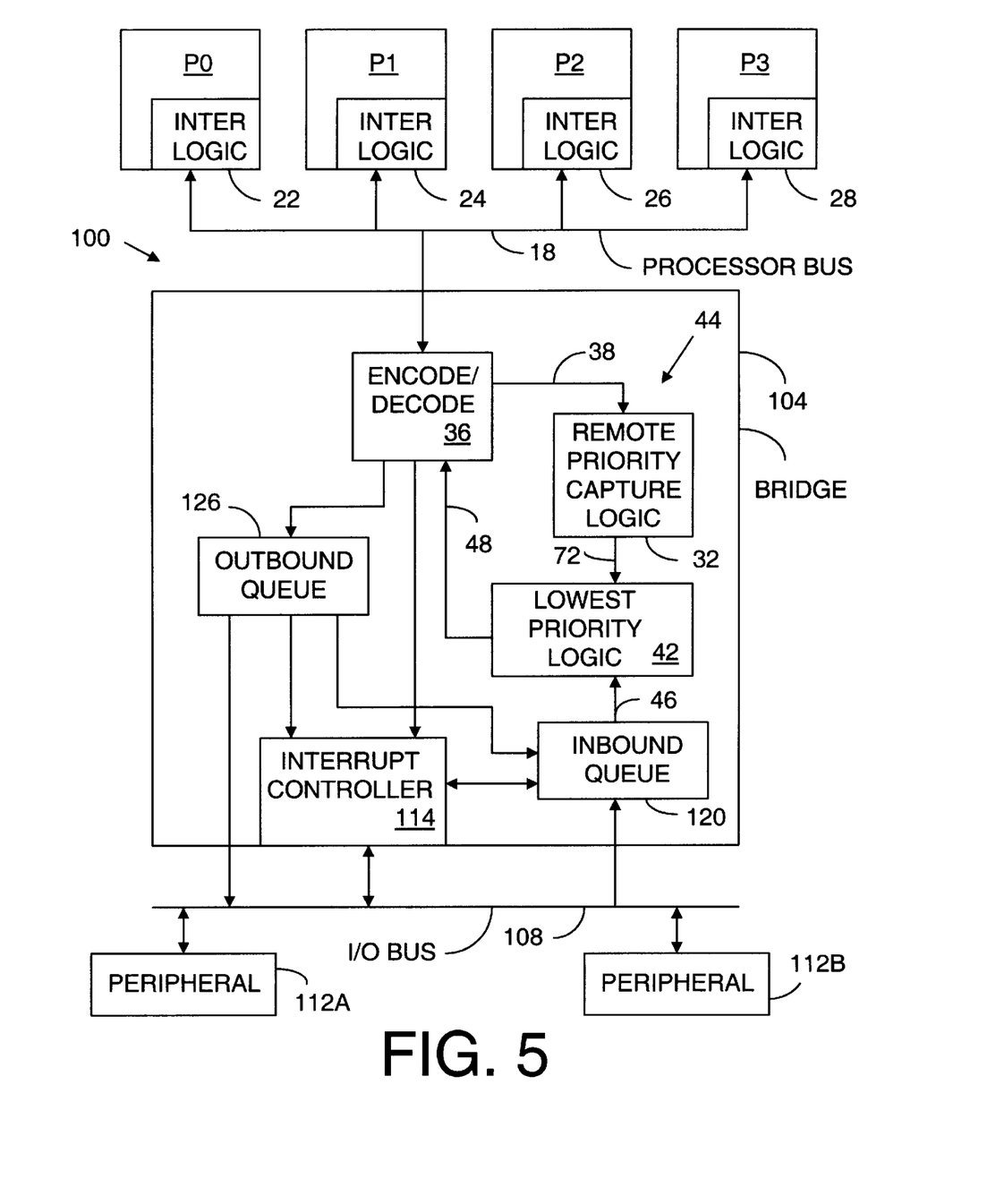
FIG. 5 is a block diagram representation of one embodiment of a multi-processor system including interrupt direction logic, remote priority capture logic, and encode/decode logic in a bridge for directing interrupts to a lowest priority processor.

There may be circuitry (not shown in FIG. 1) between encode/decode logic 36 and remote priority capture logic 32, and between encode/decode logic 36 and lowest priority logic 42. Remote priority capture logic 32 and lowest priority logic 42 are not required to be in the processor bus bridge (which in some embodiments is called the North bridge). FIG. 5 illustrates a system 100 wherein central agent 44 is included in a processor bridge (or chipset) 104. Bridge 104 interfaces between an I/O bus 108 and peripherals 112A and 112B connected thereto (which may interface according to a well known Peripheral Component Interconnect (PCI) standard). Peripherals 112A and 112B represent a variety of components including interrupt controllers or bridges to other busses. Bridge 104 may be designed so that the features of the present invention are transparent to peripherals and/or operating system software. That is, under one embodiment, the peripheral and/or operating system need not know whether a processor bus or APIC serial bus are being used to communicate between the processors and bridge.

FIG. 5 illustrates one of the variety of ways of implementing bridge 104. An I/O interrupt controller 114 may be constructed according to a well known manner or be especially designed for the present invention. Interrupt controller 114 may include an I/O redirection table to provide a relationship between I/O interrupt requests and the destination of the targeted request. I/O redirection table may provide interrupt vectors to identify the entry into a table which designates the appropriate interrupt service routine. An inbound queue 120 holds interrupt requests waiting to be sent to a processor. An optional outbound queue 126 holds signals communicated from a processor.

Figure 6:
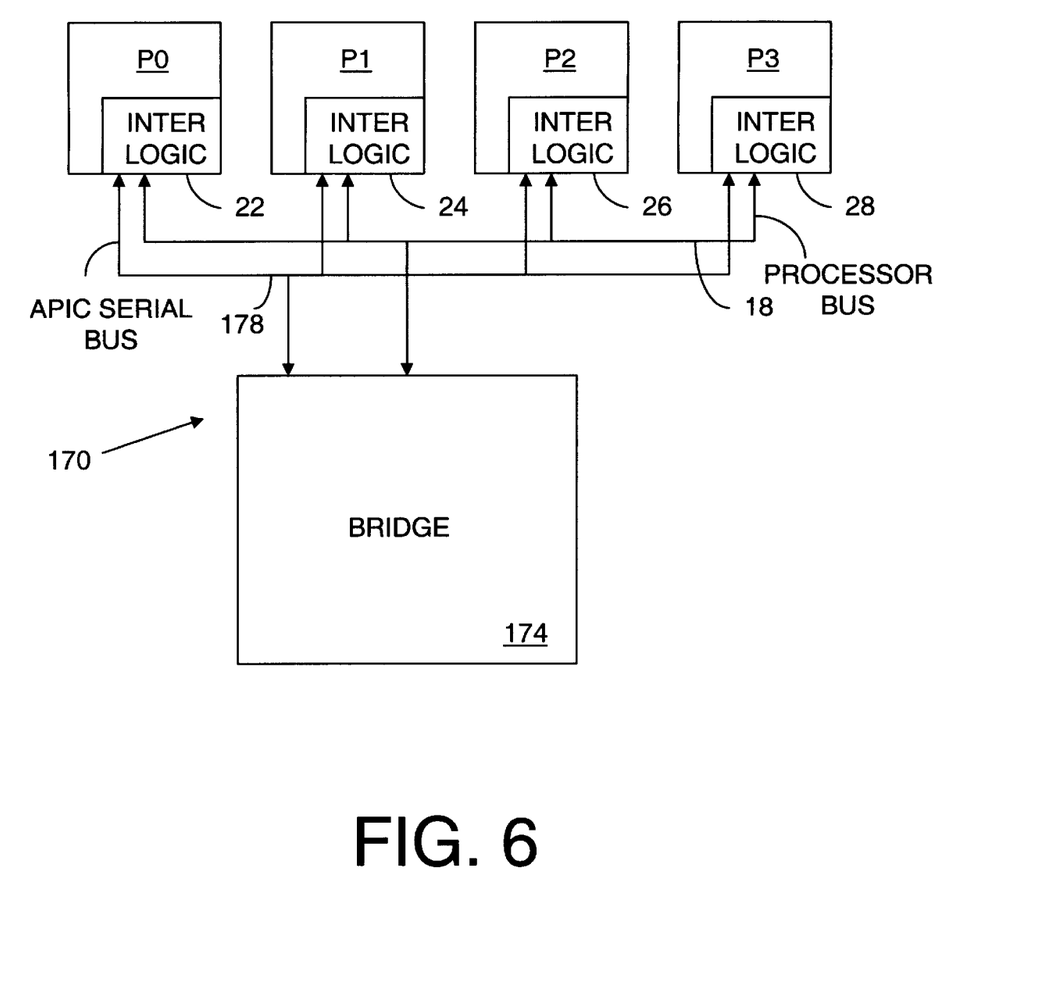
FIG. 6 is a block diagram representation of a multi-processor system similar to that of FIG. 5 with the addition of an APIC serial bus.

System 100 of FIG. 5 does not include an APIC serial bus. Referring to FIG. 6, a system 170 includes a bridge 174 that includes remote priority capture logic and redirection logic according to an embodiment of the present invention. Bridge 174 allows interrupt messages to pass on processor bus 18 between bridge 174 and processors P0, P1, P2, and P3. System 170 also includes an APIC serial bus 178 that allows operations that are performed by APIC serial busses of the prior art. Bridge 174 may therefore be used by processors that understand interrupt messages on processor bus 18 and by processors that understand interrupt messages on APIC serial bus 178. Depending on the processor, it may be that the direct interface with the processor will have to be different, but a common bridge could be used by both.

The various bridges illustrated and discussed may include a variety of components that are well known in the art, but which are not illustrated and discussed here because such illustration and discussion are not necessary to understand the present invention.

Lowest priority logic 42 may be used in connection with IPI messages. For example, the IPI signal from the directing processor P0, P1, P2, or P3 is forwarded to bridge 104 or 170. Merely as an example, the IPI message may be forward to I/O bus 108 and then directed through bridge 104 back to the processor selected by lowest priority logic 42. Alternatively, the IPI signal may be forwarded directly to the inbound queue 120. When the IPI is first provided to bus 18, an address bit (e.g., Aa3#) in the first phase of the IPI may be set to a first voltage (e.g., high) indicating that interrupt request is to be ignored by the processors, but is to be consumed by the bridge. When the IPI request returns from bridge, the bit will be set to a second voltage (e.g., low), so that the selected (target) processor will consume the IPI.

The following table summarizes the effect of the state of certain signals on processor bus 18 in one embodiment of the invention, where X means don't care; Ab5# and Ab6# are in the second phase of the transactions; during fixed delivery mode, lowest priority logic 42 does not perform LPIDA; and during redirected delivery mode, lowest priority logic 42 does perform LPIDA:

| Aa3# | Ab6# (EXF3#) | Ab5# (EXF2#) | Interrupt Transaction Type |
|---|---|---|---|
| 0 | 0 | 0 | Fixed Delivery Mode- Physical Destination Mode |

| Aa3# | Ab6# (EXF3#) | Ab5# (EXF2#) | Interrupt Transaction Type |
|---|---|---|---|
| 0 | 0 | 1 | Fixed Delivery Mode- Logical Destination Mode |
| 0 | 1 | X | Reserved |
| 1 | 0 | 0 | Redirected Delivery Mode- Physical Destination Mode |
| 1 | 0 | 1 | Redirected Delivery Mode- Logical Destination Mode |
| 1 | 1 | 0 | Reserved |
| 1 | 1 | 1 | End of Interrupt (EOI) |

A bit (e.g., Aa3#) in the address field of the interrupt message may indicate whether LPIDA should occur at all for a particular interrupt message, regardless of the states of the enable/disable bits in remote priority capture logic 32. This bit, which may be called the redirection bit, may be computed based on the lowest priority encoding, bits [10:8] (e.g., 001), of an I/O redirection table in interrupt controller 114.

Lowest priority logic 42 may be used in connection with physical destination mode and logical destination mode. Under one embodiment, under physical destination mode, target processors are selected based on unique APIC IDs. Accordingly, each interrupt can be directed to a given processor based on its unique APIC ID value. Under logic destination mode, target processors are selected based on a logical ID value programmed into each APIC. Since a logical ID is programmed, and therefore not necessarily unique to a given processor, they can identify a group Of processors to be targeted. Interrupt message bits (e.g., Ab5# and Ab6#) may indicate whether a physical or logical destination mode is used. In physical destination mode, lowest priority logic 42 may select any of the processors on the cluster as the processor to receive the interrupt (assuming the enable/disable bit in remote priority capture logic 32 is set to enable for that processor).

In logic destination mode, the system may operate as follows. Lowest priority logic 42 or other circuitry checks the logical ID to determine whether the interrupt is directed to a processor within the logical cluster. If the interrupt message is directed to one of the processors on processor bus 18, lowest priority logic 42 may determine the destination processor from the group of processors indicated in the logical ID. The directed interrupt on processor bus 18 will be sent to the processor with the lowest interrupt priority from the group of processors indicated by the logical ID. For example, suppose four processors are in a system at the logical mode cluster address of 00xxh (hex). If an I/O interrupt arrives at the host bridge and has the logical ID of '00000111', and is tagged to be redirected, LPIDA may be determined for P2 to P0.

FIGS. 1 illustrates multi-processor systems. Alternatively, central agent 44 or bridge 100 may be used in connection with a single processor. In that case, in one embodiment, lowest priority logic 42 always sends interrupt messages to that processor. Under one approach, remote priority capture logic 32 is inactive if there is only one processor. Under another approach, remote priority capture logic 32 is active, but the RTPR corresponding to the processor is the only enabled RTPR. The only processor in the system may or may not provide signals representative of its task priority. Under one embodiment, if only one enable/disable bit is set in remote priority capture logic 32, lowest priority logic 42 will direct the interrupt to that processor regardless of what is in the TPR field. Alternatively, remote priority capture logic 32 could include some other indication as to there being only one processor. Where there is only one processor, the priority captured by remote priority capture logic 32 may merely be that a processor is available for interrupts.

According to one embodiment of the invention, interrupt messages are assigned a memory address within a one megabyte space of memory. In a 4 Gigabyte space, the one megabyte location can be between FEE00000h and FEEF-FFFFh. The memory location may be used to identify a particular destination.

In one embodiment, processors P0, P1, P2, and P3, and encode/decode logic 36, and (optionally) the operating system are designed so that processors P0, P1, P2, or P3 can write RTPR updates directly to RTPRs 62, 64, 66, or 68, respectively. In this embodiment, the RTPRs may be treated as I/O space. In another embodiment, processors P0, P1, P2, and P3, encode/decode logic 36, and (optionally) the operating system do not allow that capability for processors P0, P1, P2, and P3 to write a RTPR update directly to RTPRs 62, 64, 66, and 68, but rather use a RTPR update special cycle transaction over processor bus 18 to update the RTPRs. Processors of this other embodiment are particularly suited for currently used operating systems and interrupt semantics.

B. RTPR Update Special Cycle Transaction

Figure 7:
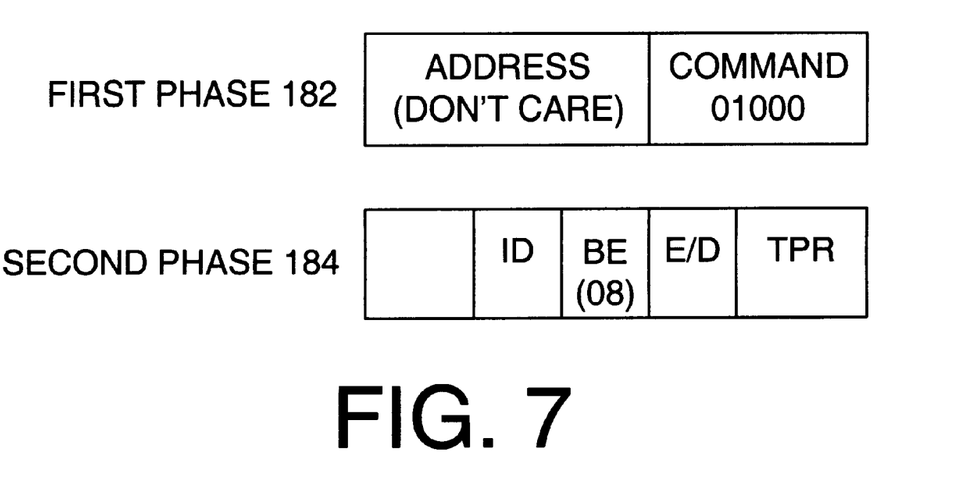
FIG. 7 illustrates a two phase special cycle for RTPR update.

Referring to FIG. 7, one embodiment of a RTPR update special cycle transaction includes two phases 182 and 184. Phase 182 includes a command field (e.g., 5 LSBs) and an address field (e.g., 26 MSBs). As an example, bits "01000" in the command field indicate a special cycle. In the case of a special cycle, the address bits may be don't care. Phase 184 includes a byte enable field (e.g., 00001000 or 08h) that indicates an RTPR update cycle; a processor ID field that indicates which processor is providing the update; an enable/disable (E/D) bit to indicate whether the processor is available for LPIDA; and TPR bits representing, for example, the four MSBs of the corresponding LTPR. In the example of FIG. 4, the TPR bits may be placed in bits 0–3 and the E/D bit may be placed in bit 7 of the RTPR. The E/D bit and TPR bits may be provided within what is otherwise the 8-bit attribute field.

Encode/decode logic 36 responds to the command field of phase 182 and the byte enable field of phase 184 by providing an update to the RTPR designated by the processor ID field in remote priority capture logic 32. The RTPR is updated with bits representing the E/D bit and/or the TPR bits. Where the E/D bit indicates the processor is disabled, the RTPR may or may not be also updated with the TRP bits. In one embodiment, where the E/D bit indicates the processor is disabled, the processor does not provide meaningful task priority data in the TPR bits. In another embodiment, the processor provides current TPR bits regardless of the state of the E/D bit.

Through the signals of FIG. 7, processor P0, P1, P2, or P3 and encode/decode logic 36 provide a hardware assist mechanism to alias RTPR 62, 64, 66, or 68 without the operating system being aware of the update. (Alternatively, the operating system could be aware.) Various other signal arrangements may be used in place of those illustrated in FIG. 7. For example, all the information could be provided in one phase. As another example, phase 184 could provide an update for more than one of RTPR 62, 64, 66, and 68 at a time. In the illustrated and described example, the RTPRs hold only four bits to represent the processor task priority. The TPR bits in phase 184 may represent more or less than the four MSBs of the corresponding LTPR, where the RTPRs holds more or less than four bits, respectively, to represent the task priority.

C. Systems and Transactions to Provide EOI Signal

Figure 8:
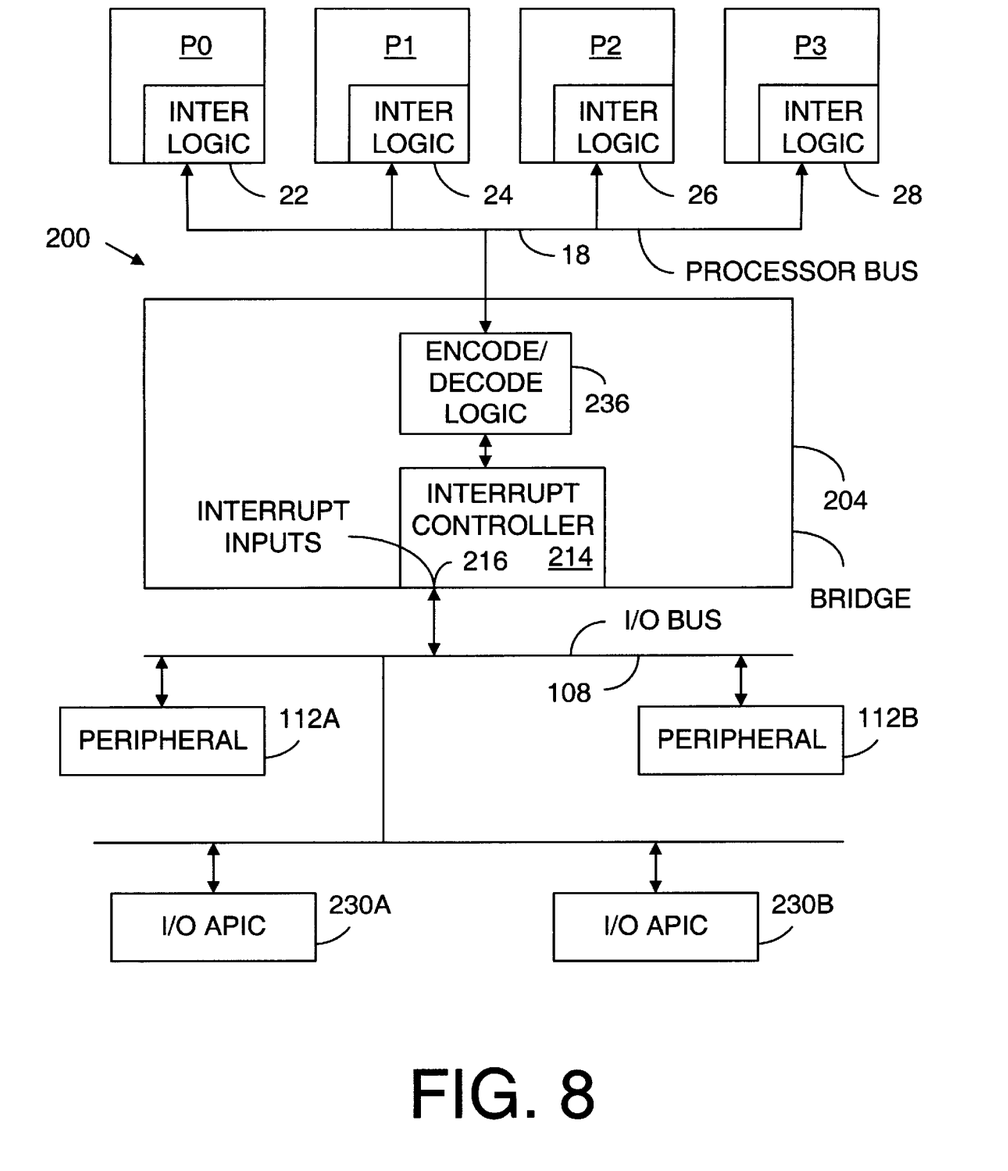
FIG. 8 is a block diagram representation of system included at least one processor that issues an EOI to an interrupt controller over the processor bus according to one embodiment of the invention.

Referring to FIG. 8, a system 200 includes processors P0, P1, P2, and P3 and a bridge 204. System 200 provides an EOI signal over processor bus 18 to an interrupt controller 214 or peripheral. The value of providing the EOI signal is not dependent on there being more than one processor. Accordingly, system 200 could be a single processor system rather than a multi-processor system as illustrated. I/O interrupt controller 214 may be included in bridge 204 or elsewhere. Interrupt controller 214 may be identical to or different than interrupt controller 114. Bridge 204 includes encode/decode logic 236 and other components (not shown). The other components could include, but are not required to include, remote priority capture logic and lowest priority logic as illustrated in FIGS. 1 or 5. Interrupt controller 214 detects interrupt signals from peripherals on I/O bus 108, which may include peripherals 112A, 112B, and one or more peripherals having I/O APICs such as peripherals 230A and 230B, which in turn may receive interrupts from additional peripherals (not shown). The peripherals may be the same as are concurrently used or especially designed for the present invention.

I/O interrupt signals include two types of signally semantics: edge triggered and level triggered. Interrupt controller 214 has interrupt input ports 216 to detect interrupts from peripherals over I/O bus 108. Interrupt input ports 216 may be pins. With edge triggered interrupts, each edge is a different interrupt event. With a level triggered interrupt, the interrupt signal is asserted (e.g., active high) at one of interrupt input ports 216. One reason why level triggered interrupts are used is that multiple interrupts from a peripheral(s) can be concurrently supplied to a single interrupt input port. The interrupt signal may includes bits indicating whether it is an edge triggered or level triggered interrupt.

In response to receiving a level triggered interrupt at the input port, interrupt controller 214 and perhaps also lowest priority logic (which is optional) cause an interrupt to be forwarded to one of processors P0, P1, P2, or P3. A vector identifying the source of the interrupt is supplied by interrupt controller 214 to the selected processor. After the processor services the interrupt, the peripheral no longer applies that particular level triggered interrupt signal to the input port of interrupt controller 214, although the same or another peripheral may have concurrently applied another level triggered interrupt signal to that input port. After the processor has serviced the interrupt, the processor sends an end-of-interrupt (EOI) signal over processor bus 18 to interrupt controller 214 indicating the interrupt has been serviced.

The purpose of sending an EOI signal to interrupt controller 214 is as follows. There may be more than one interrupt signal applied to a given interrupt input port of interrupt controller 214. When interrupt controller 214 receives an interrupt signal it sets a state bit (e.g., to a logic 1) that corresponds to that interrupt input port. For example, referring to FIG. 9, the state bit may be in I/O redirection table 240 in interrupt controller 214. The state bit could be a remote IRR bit (e.g., bit 14 in an entry to the I/O redirection table). Alternatively, the state bit may be elsewhere. I/O redirection table 240 contains a state bit corresponding to each interrupt input port and vector. (I/O redirection table 240 may contain numerous other bits regarding details of the interrupt.)

Figure 9:
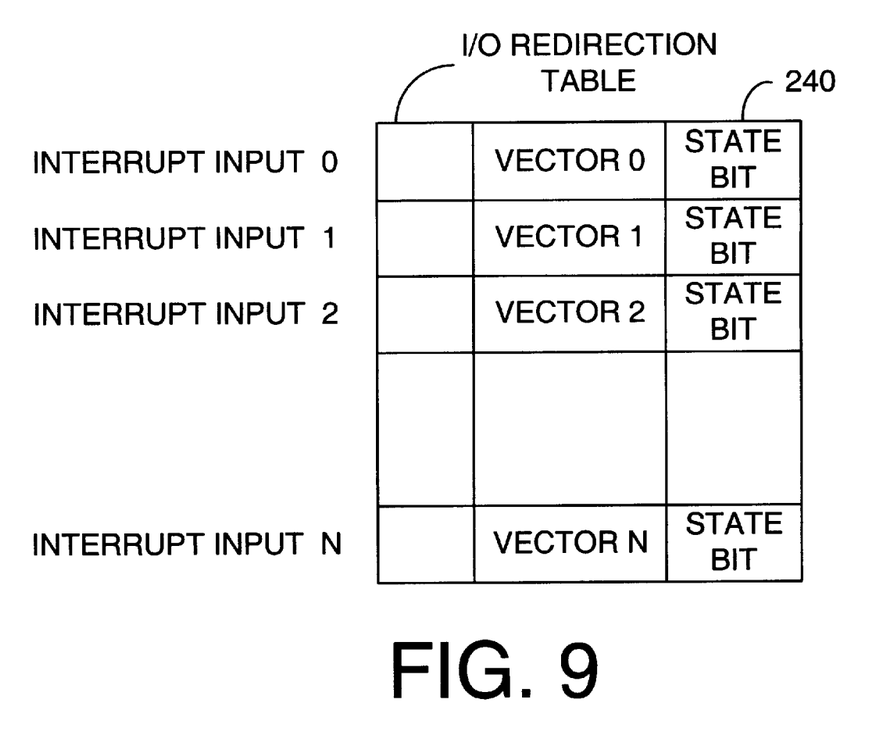
FIG. 9 is a graphical representation of an I/O redirection table according to one embodiment of the invention included in the interrupt controller of FIG. 9.

While the state bit is set, there may be more than one interrupt signal asserted at one of input ports 216. Interrupt controller 214 can only recognize one interrupt signal at a time. Once it receives the EOI signal, interrupt controller 214 resets or clears (e.g., to a logic 0) the state bit of the corresponding vector. Interrupt controller 214 then observes whether there is an interrupt signal asserted at the interrupt input port. If there is, then interrupt controller 214 and perhaps lowest priority logic direct an interrupt signal to one of the processors for that interrupt signal asserted on that interrupt input port.

Peripherals 230A and 230B having I/O APICs can also include an I/O redirection table with state bits that are set in response to issuing an interrupt signal to a processor and reset in response to receiving an EOI signal.

One technique for providing the EOI signal to interrupt controller 214 or another controller, such as peripheral 230A or 230B, is to provide a transaction on processor bus 18 that is interpreted by encode/decode logic 236 to be an interrupt EOI signal.

Figure 10:
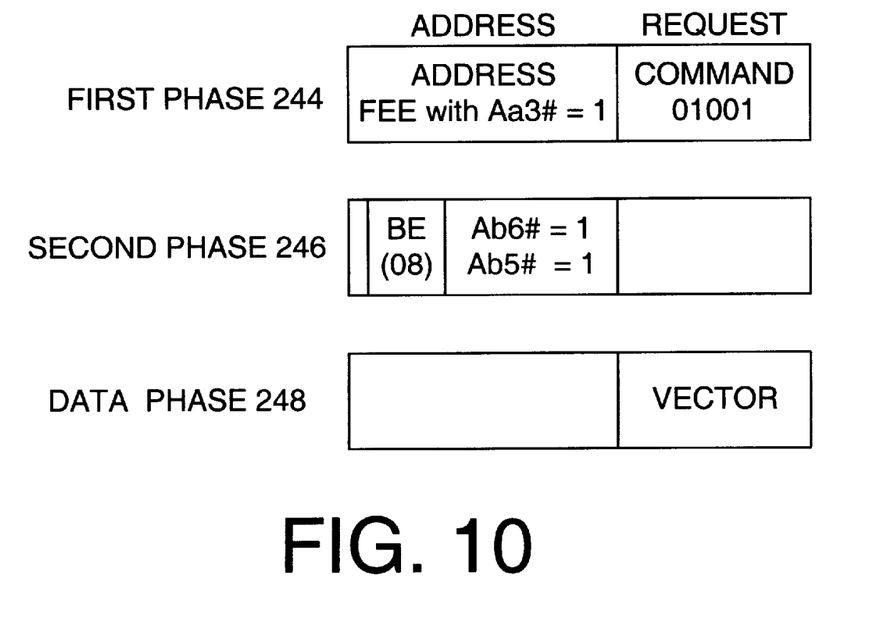
FIG. 10 illustrates an EOI transaction to be conducted over the processor bus.

For example, referring to FIG. 10, a transaction to communicate an EOI signal could includes a request phase including a first phase 244 and a second phase 246, and a data phase 248. First phase 244 and second phase 246 each include an address and a request. First phase 244 includes a command field and an address field. The command field in the request may include bits 01001 to indicated an Interrupt/EOI. The address may be FEEXXXXX, except that, for example, bit Aa3# may be a "1" to indicate what follows is a directed interrupt message, an EOI message, or an interrupt request that requires interrupt redirection. If bit Aa3# is a "1", processors ignore the transaction and encode/decode logic 36 accepts the transaction. Second phase 246 may include a byte enable of 00001111 (OFh) and bits Ab6# and Ab5# (EXF 4 to 0; Ab7:3) each equal to 1. Data phase 248 may provide the interrupt vector. Of course, numerous other signals other than those shown in FIG. 10 could be used to communicate the EOI signal over processor bus 18.

Under the embodiment described above in connection with FIGS. 9 and 10, the EOI signal may be broadcast to each of the interrupt controllers. In another embodiment, interrupt agents may be given specific I/O space and the processors may include the capability to direct interrupt signals to the agents.

The transactions of FIGS. 7 and 10 may be transparent to the operating system and peripherals. Alternatively, the operating system and peripherals may be specifically designed for the transactions of FIG. 7 and 10.

Additional Information and Embodiments

The specification does not describe or illustrate various well known components, features, and conductors, a discussion of which is not necessary to understand the invention and inclusion of which would tend to obscure the invention. Furthermore, in constructing an embodiment of the invention, there would be various design tradeoffs and choices, which would vary from embodiment to embodiment. Indeed, there are a variety of ways of implementing the illustrated and unillustrated components.

The borders of the boxes in the figures are for illustrative purposes and do not restrict the boundaries of the components, which may overlap. The relative size of the illustrative components does not suggest actual relative sizes. Arrows show principle data flow in one embodiment, but not every signal, such as requests for data flow. As used herein "logic" does not mean that software control cannot be involved. The term "conductor" is intended to be interpreted broadly and includes devices that conduct although they also have some insulating properties. There may be intermediate components or conductors between the illustrated components and conductors.

The phrase "in one embodiment" means that the particular feature, structure, or characteristic following the phrase is included in at least one embodiment of the invention, and may be included in more than one embodiment of the invention. Also, the appearances of the phrase "in one embodiment" in various places in the specification are not necessarily all referring to the same one embodiment.

Lowest priority logic 42 may direct (or redirect) interrupts across multiple nodes.

A processor could have more than one priority for different kinds of tasks, and the remote priority capture logic and lowest priority logic could take the different priorities into account.

The encode and decode logic of encode/decode logic 36 may be physically connected or separated. The encode and decode logic of encode/decode logic 58 may be physically connected or separated.

For a multiprocessor system within a single chip, there could be interrupt capture logic and lowest priority logic within that chip.

The term "connected" and "coupled" and related terms are used in an operational sense and are not necessarily limited to a direct connection or coupling. If the specification states a component or feature "may", "can", "could", or is "preferred" to be included or have a characteristic, that particular component or feature is not required to be included or have the characteristic. The term "responsive" includes completely or partially responsive.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. An apparatus for use with a computer system having a processor bus and at least one processor, comprising:
   decode logic to receive through the processor bus a task priority update transaction including data representative of a task priority designation of a processor of the computer system, and to provide a signal responsive thereto; and
   centralized remote priority capture logic, having at least first and second remote task priority registers (RTPRs), to receive the signal responsive to the task priority update transaction and update contents of one of the RTPRs depending on which processor in the computer system had its task priority designation represented by the data in the task priority update transaction.

2. The apparatus of claim 1, wherein the the computer system includes only one processor and the remote priority capture logic includes four RTPRs of which the first and second RTPRs are included, and wherein only one of the RTPRs has contents which is updated in response the signal responsive to the task priority update transaction.

3. The apparatus of claim 1, wherein the task priority update transaction includes a first phase and a second phase and the data representative of the task priority designation is in one of the phases.

4. The apparatus of claim 1, wherein the apparatus is a bridge.

5. A computer system, comprising:
   at least first and second processors to selectively provide task priority update transactions including data representative of a task priority designation of a corresponding one of the first and second processors;
   a processor bus coupled to the first and second processors to receive the task priority update transactions; and centralized remote priority capture logic having at least first and second remote task priority registers (RTPRs) having contents that are updated in response a task priority update transaction including data representative of a task priority designation of the first and second processors, respectively, the remote priority capture logic to receive signals responsive to the task priority update transactions and update contents of the corresponding RTPR in response thereto.

6. The system of claim 5, wherein the computer system further comprises third and fourth processors, and wherein the remote priority capture logic includes third and fourth RTPRs.

7. The system of claim 5, wherein the task priority update transactions include a first phase and a second phase, the first phase including an update transaction type and the second phase including data identifying one of the RTPRs and task priority data.

8. The system of claim 5, wherein the task priority update transactions include a first phase and a second phase, the first phase including an update transaction type and the second phase including information regarding whether the processor is available for lowest priority interrupt direction arbitration (LPIDA).

9. A method of updating remote priority capture logic, comprising:

providing a task priority update transaction including data representative of task priority designations of a processor to a processor bus;

receiving the task priority update transaction from the bus and providing a signal representative thereof; and selecting one of multiple remote task priority registers (RTPRs) in centralized remote priority capture logic; and updating the selected RTPR in response to the signal representative of the transaction.

10. The system of claim 5, wherein the remote priority capture logic is in a bridge.

* * * * *